United States Patent [19]

Mineur

[11] Patent Number: 4,793,877
[45] Date of Patent: Dec. 27, 1988

[54] METHOD FOR PREVENTING WATER FROM TRACKING INTO A CABLE SPLICE AREA

[75] Inventor: Thomas L. Mineur, High Bridge, N.J.

[73] Assignee: Thomas & Betts Corporation, Bridgewater, N.J.

[21] Appl. No.: 55,096

[22] Filed: May 28, 1987

[51] Int. Cl.⁴ .................................... H01B 13/06
[52] U.S. Cl. ................................ 156/48; 156/49; 156/52; 174/23 R
[58] Field of Search ................ 156/48, 49, 52; 174/23 R; 264/272.11

[56] References Cited

U.S. PATENT DOCUMENTS

| 2,930,835 | 3/1960 | Bollmeier | 156/48 X |
| 2,957,038 | 10/1960 | Greenidge et al. | 174/23 R |
| 2,967,795 | 1/1961 | Bollmeier et al. | |
| 3,347,974 | 10/1967 | Arendt et al. | 174/23 R |
| 3,361,605 | 1/1968 | Gilbert | 156/48 |
| 3,427,393 | 2/1969 | Masterson | 174/23 R |
| 3,619,481 | 11/1971 | Smith | 174/138 F |
| 3,823,250 | 7/1974 | DeMonsy et al. | 174/23 R |
| 4,025,717 | 5/1977 | Whittingham | 174/88 C |
| 4,484,962 | 11/1984 | Dienes et al. | 156/49 |
| 4,501,927 | 2/1985 | Sievert | 156/49 X |
| 4,545,830 | 10/1985 | Dienes et al. | 156/48 |
| 4,685,981 | 8/1987 | Dienes | 156/48 |

OTHER PUBLICATIONS

Raychem Corporation, "XAGA 1600 Buried Splice Closure System", undated, two pages.

Primary Examiner—Robert A. Dawson
Attorney, Agent, or Firm—Robert M. Rodrick; Salvatore J. Abbruzzese

[57] ABSTRACT

A method of preventing core water from tracking through an electrical cable to a cable splice area is disclosed. The method incorporates a pair of water blocks placed on each side of the cable splice area which blocks the core water thus preventing entry into the cable splice area. The cable blocks are formed by disposing a curable blocking compound around the cable adjacent each side of the cable splice area. The curable compound hardens to a solid form thereby blocking core water penetration.

11 Claims, 3 Drawing Sheets

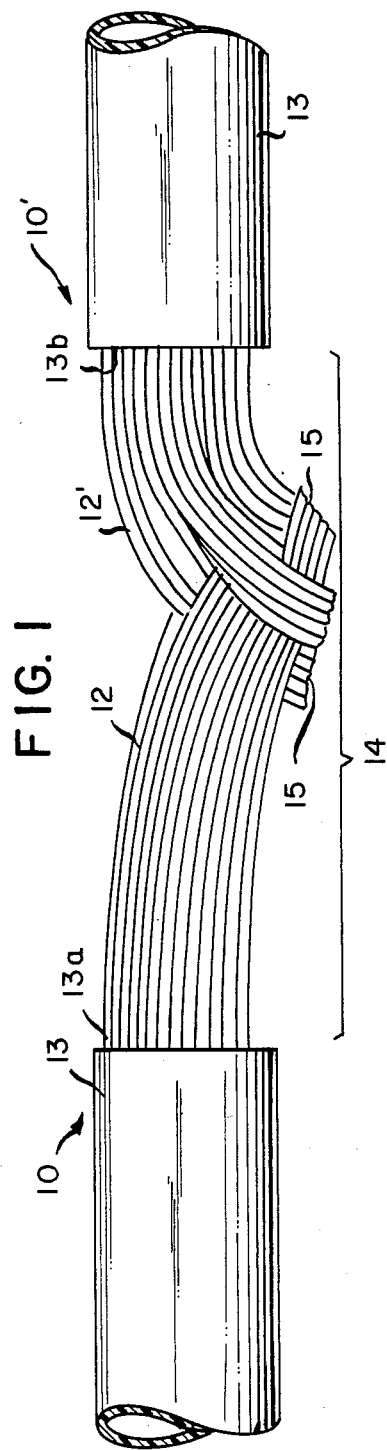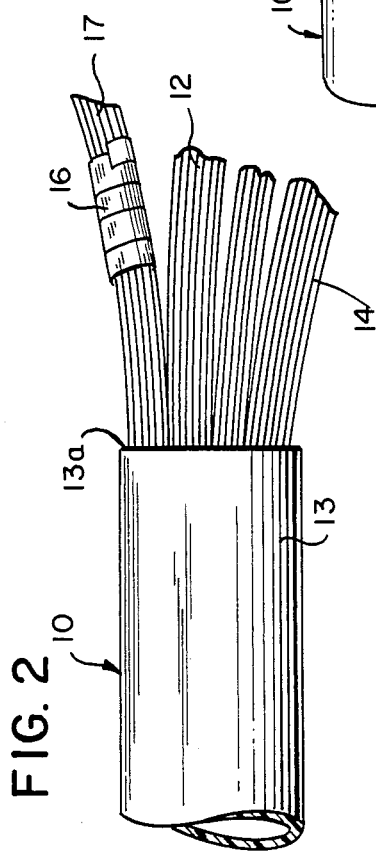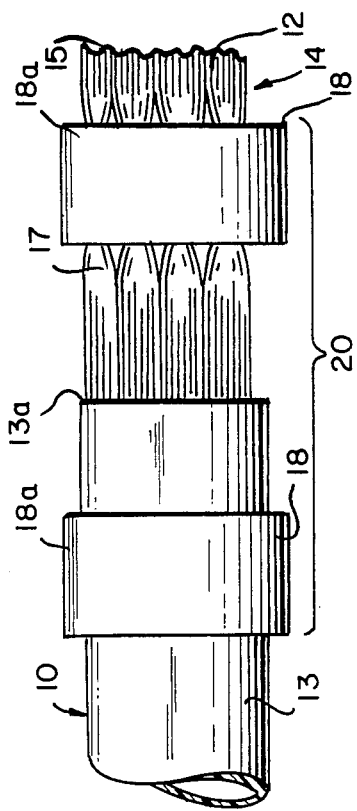

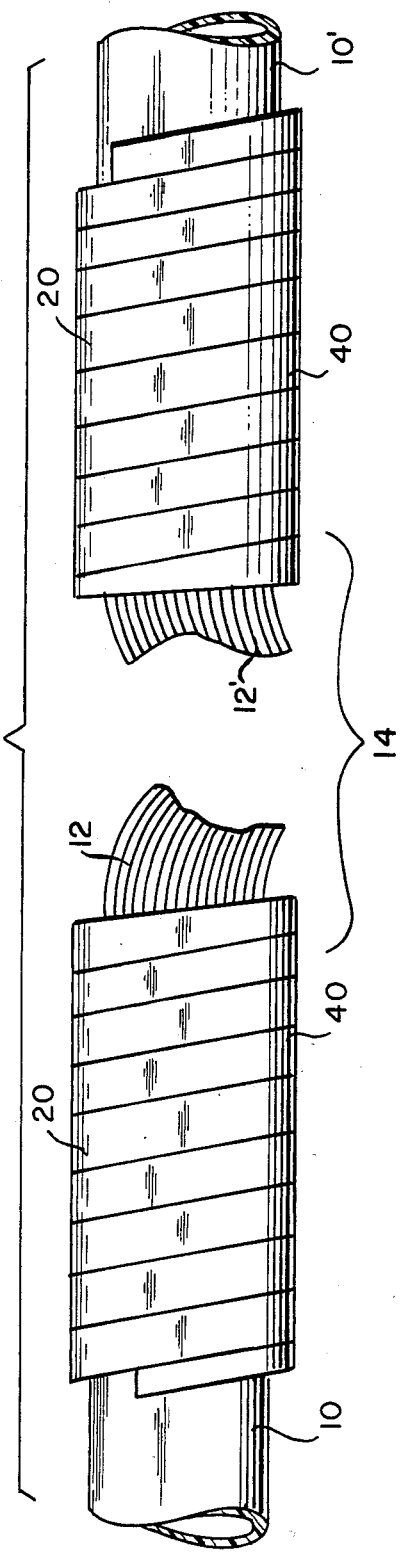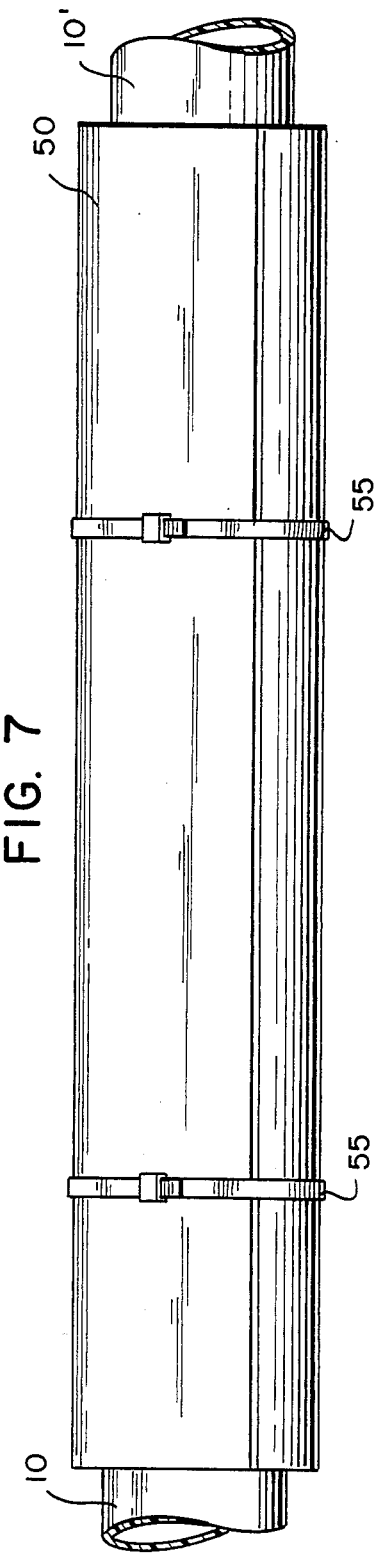

METHOD FOR PREVENTING WATER FROM TRACKING INTO A CABLE SPLICE AREA

FIELD OF INVENTION

This invention relates generally to a method for preventing water from tracking through a cable core into a cable splice location and more particularly relates to a method for blocking the cable core on either side of the splice location to prevent water from tracking through the cable core into the cable splice location.

BACKGROUND OF THE INVENTION

Electrical cable, especially telephone cable is typically run outdoors, either suspended between utility poles high above ground level or burried beneath the ground. The cable itself is composed of many small diameter insulated telephone conductors encased in an outer insulative jacket. While the outer insulative jacket is a non-porous plastic enclosure, imperfections in the cable jacket, either at the time of manufacture or due to exposure to the elements, may permit water to enter the jacket and flow within the core of the cable. Also, in order to make repairs or for routine maintenance, the integrity of the jacket is often violated making water entry more prevalent.

Water tracking through the cable core may adversely affect electrical transmission through the telephone conductors. This problem is more acute at cable splice locations where two cables are joined to form a connection. These splice locations may be the low point in the cable. Thus, any water which may have entered the cable core will tend to accumulate at the cable splice location. Water at the point of connection between telephone conductors may cause shorting between the connected conductors.

There are available, a number of cable closures which adequately seal the cable splice area preventing water from entering at the splice location from outside the cable. However, these closures do not prevent water which is already in the cable core from tracking through to the splice area. Prior art techniques have addressed the problem of water tracking through the cable core. One technique which is quite adequate in preventing water from tracking through the splice location is to enclose the splice area with a permanent, curable, potting compound which provides a nearly solid plastic enclosure in and around the conductors of the cable. However, it is quite obvious that this technique is permanent and non-reenterable. There are situations where an installer, subsequent to making a cable splice, must again enter that splice area to effect repairs or maintenance. A potting compound such as described above would not permit such re-entry. Thus the entire potted location would have to be cut from the cable and a new section of cable spliced therein. The technique of potting or otherwise permanently enclosing the cable splice area is time-consuming, expensive, and difficult to install.

A second technique now practiced in the telephone industry is to use a non-curable encapsulating gel which is placed in and around the conductors and the spliced connectors at the splice area. Since the gel does not cure to a permanent set, the splice area may be re-entered and the gel wiped away to expose the spliced conductors. While still cumbersome and messy, this technique at least allows re-entry into the cable splice area. However, in long term applications it has been found that a method employing gel encapsulant does not totally prevent core water from tracking through the splice area. Thus in time, the adverse effects of water tracking through the cable core may appear even in gel-enclosed splices.

Accordingly, it is desirable to provide a technique for enclosing a cable splice area where water in the cable core cannot track into the splice area. Further, the enclosure should admit to re-entry to permit subsequent access to the spliced conductors.

SUMMARY OF THE INVENTION

It is an object of the present invention to provide an improved method for protecting a splice location of an electrical cable.

It is a further object of the present invention to provide a method for preventing water from tracking through the cable splice area.

It is a still further object of the present invention to provide a re-enterable splice enclosure which will prevent water from accumulating at the splice area.

In the efficient attainment of the foregoing and other objects, the present invention provides a method for sealably enclosing a cable splice area where a water dam is formed on each side of the splice area. The dam is formed of a curable blocking compound which prevents water from tracking through the cable core into the splice area. A cover is disposed around the exposed area and the dams to prevent water from entering at the splice area from outside the cable.

As more particularly described by way of a preferred embodiment disclosed herein, an electrical cable or cables, including an outer insulative jacket and plural insulative conductors extending therethrough, may include a centrally located splice area where plural of the insulated conductors are spliced or otherwise connected together. A method of sealably protecting this splice area from core water penetration is provided herein. A dam is formed on each side of the splice area where each dam spans a portion of the cable jacket and a portion of the splice area. An upwardly opening pouch is disposed around each dam. Each pouch is filled with a curable blocking compound which takes a permanent set around and among the insulated conductors. The splice location is then sealably covered along with each of the dams to form a sealed splice. Once the blocking compound has set, water cannot track through the cable core into the spliced location.

BRIEF DESCRIPTION OF THE DRAWINGS

FIG. 1 is a side elevational view of a pair of insulated telephone cables where the insulated conductors extending therethrough are to be centrally spliced.

FIGS. 2 through 5 are partial side elevational views of one of the cables of FIG. 1 prepared in accordance with the method of the present invention.

FIG. 6 is a side elevational view of the cables of FIG. 1 including enclosures placed on either side of the spliced area.

FIG. 7 is a side elevational showing of the cables of FIG. 6 including a sealing cover disposed thereover.

DETAILED DESCRIPTION OF THE PREFERRED EMBODIMENTS

Figure 4:
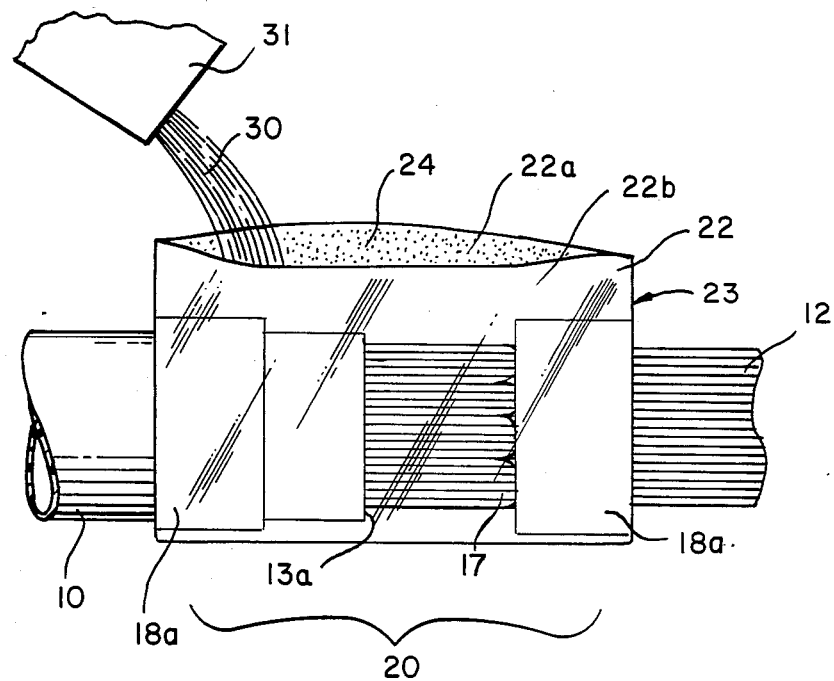

In FIG. 1, a pair of telephone cables 10 and 10' are shown. Cables 10 and 10' include a plurality of insulated telephone conductors 12 forming the core of the cable.

Conductors 12 are of conventional construction, each being a copper wire having plastic insulation thereover. The conductors 12 of each of cables 10 and 10' are enclosed in an outer insulative jacket 13 which may also be formed of plastic. An end portion of each jacket 13 is typically striped away to expose the conductor ends 15 for splicing. The cut ends 13a and 13b of jackets 13 define an exposed cable splice area 14. The conductors 12 may be spliced at the ends 15 thereof. Techniques for splicing conductors of telephone cable are well known in the art. Usually one cable 10, having numerous conductors 12 is spliced to another cable 10' having a like number of conductors. It may also be the case that two cables 10 of a given size may be spliced to a larger cable 10' having a greater number of conductors. The area at which these cables are spliced together is typically referred to as the cable splice area.

Once spliced together, the exposed conductors 12 must be enclosed to be protected from environmental hazards. Also, water already in the core of cables 10 and 10' must be prevented from entering the cable splice area 14. The present invention contemplates protecting the cable splice area 14 from core water penetration by placing a water block on each side of the location at which the conductors 12 are spliced. Since an identical block is formed on each side of the spliced conductor ends 15, for simplicity of explanation, only cable 10 on one side of the splice area 14 is shown and described in FIGS. 2 through 5. It is understood that the same technique is to be practiced on cable 10' on the other side of the exposed splice area 14.

Referring now to FIG. 2, in order to prepare the conductors 12 for enclosing in the manner set forth herein, the conductors 12 are separated into plural groups 17 adjacent jacket end 13a. As the telephone cable 10 typically includes 50 to 200 pairs or more of conductors 12, each of the individual groups 17 may include approximately 10 to 100 conductor pairs. In order to spatially separate the individual groups 17, the groups are wrapped with several helical turns of sealant tape 16. The several wraps of sealant tape 16 provide the spatial separation between adjacent groups 17. A typical tape used for such purposes is a rubber sealant strip having adhesive surfaces on both sides. However, it is contemplated that simple vinyl electrical tape may also be employed either alone or in combination with the sealant tape to facilitate easier separation.

Referring now to FIG. 3, a water dam 20 is formed on each side of the spliced conductor ends 15 at the cable jacket end 13a. The dam 20 is formed in the manner described as follows.

Several wraps of a sealant tape 18 are placed around conductors 12, over the tape 16 which separates the conductors 12 into groups 17. The sealant tape 18 forms a raised collar 18a around conductors 12. A second wrap of sealant tape 18 is placed around jacket 13, adjacent jacket end 13a to form another raised collar 18a. Sufficient wraps of sealant tape 18 are placed to make the raised collars 18a approximately equal in thickness. Sealant tape 18 may be of the type used to form the conductors 12 into groups 17, that is, a sealant tape having two opposed adhesive surfaces to more readily adhere to the cable 10 and to itself with each successive wrap. The two collars 18a define the longitudinal extent of the water dam 20.

Referring to FIG. 4, the spaced collars 18a are surrounded by an extent of film 22. Film extent 22 may be an adhesively coated extent of flexible polyethylene having an adhesive side 22a and an opposed non-adhesive side 22b. Film extent 22 is folded approximately in half along the length of the cable 10 and around the spaced collars 18a defining dam 20. Film extent 22 forms a pouch 23 around the cable 10 and conductors 12 between collars 18a. As the adhesive surface 22a faces each collar 18a it will adhere thereto. The spaced raised collars 18a will hold the film extent 22 slightly away from the cable 10 to provide clearance therearound. The upwardly extending portions of the film extent 22 will adhere to each other to partially close the pouch 23. A central portion of the folded film extent 22 is kept open to form an access opening 24 to the water dam 20. It is also contemplated that a split tube (not shown) may be placed around and between collars 18a prior to forming the pouch. The tube would provide some degree of rigidity thereto and also help hold the pouch 23 away from cable 10 and conductor groups 17. The tube would include perforations therein to permit fluid flow therethrough as will be described hereinbelow. Further, an open celled spacer web (not shown) may also be employed. The open cells of the spacer web facilitate fluid flow in and around the conductors 12. A spacer web used for this purpose is shown and described in U.S. Pat. No. 4,685,981 issued Aug. 11, 1987 and now U.S. Pat. No. 4,685,981.

With a pouch 23 so formed by film extent 22, a curable blocking compound 30 may be poured into the pouch 23 to completely enclose and encapsulate the conductors 12 adjacent cable jacket end 13a. Blocking compound 30 is a curable blocking compound which is provided in a viscus liquid form. Blocking compound 30 is poured from a container 31 into pouch 23 so that it flows in and around the conductors 12 which have been formed into groups 17. The compound 30 also flows around the cable jacket 13 adjacent jacket end 13a. Blocking compound 30 will cure in approximately 1-3 hours to a solid form which is water impermeable. As the compound 30, when viscus, will flow between the conductor groups 17, any water which may be in the cable core between the jacket 13 and conductors 12 will be prevented from traveling past the water dam 20. Once the blocking compound 30 is poured into the pouch 23 formed by film extent 22, the opening 24 is closed and the pouch is folded over and wrapped around itself to close the water dam 20.

Figure 5:
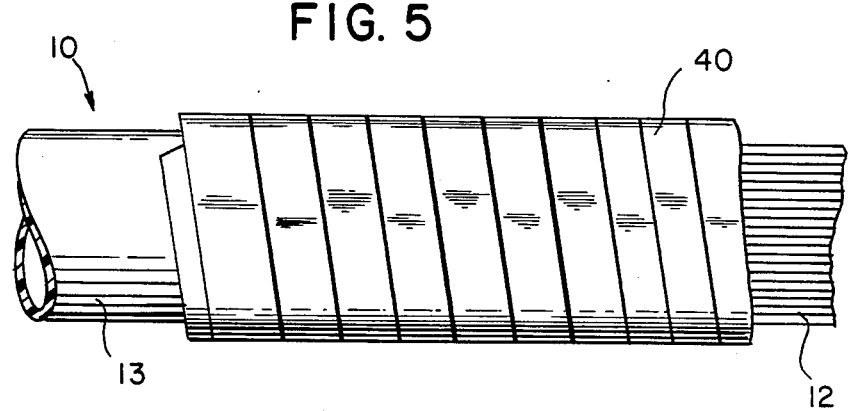

Referring now to FIG. 5, the water dam 20 may be further covered with plural wraps of a thin PVC film 40. Film 40 is provided in a roll and is disposed over the folded pouch 23 and wrapped compressibly several times thereover. The successive wraps of film 40 serve two purposes. First, it helps to keep the filled pouch 23 folded and enclosed. Second, it provides sufficient compression during wrapping to compress the viscus blocking compound 30 to ensure adequate coverage in and around conductor groups 17. Successive wrapping of film 40 around pouch 23 may also force some of the viscus blocking compound 30 into the cable core adjacent jacket end 13a. This additionally protects the cable core, preventing water from tracking therethrough. Other films or tapes of known construction may also be employed.

Referring now to FIG. 6, cables 10 and 10' are shown with water dams 20 formed as above described on each side of exposed cable splice area 14. Additional sealing steps may be practiced on the remaining exposed cable splice area 14 to sealably cover and enclose the spliced conductors 12. However, the method of the present invention provides sufficient protection so that no elaborate sealing steps may be necessary directly over exposed conductors 12.

Referring now to FIG. 7, the exposed cable splice area 14 and the spaced water dams 20 are covered to prevent direct exposure of the conductors to the external elements. The present invention contemplates employing a cable splice cover 50 which spans the spaced dams 20 as well as the exposed cable splice area 14. A typical cover employed for such purposes is that shown and described in U.S. Pat. No. 4,358,634 issued Nov. 9, 1982, which is a plastic cover having one adhesive surface which is placed against the cable and is wrapped thereover. This cover forms a water impenetrable encasement over the cable splice area 14 preventing water from entering thereinto. Cable ties 55 may be employed to hold the cover 50 closed.

Prepared in a manner described hereinabove, the cable splice area 14 is protected from water entering the cable splice location both from the external environment and from tracking through the core of cable 10.

Various changes to the foregoing described and shown structures would now be evident to those skilled in the art. Accordingly, the scope of the invention is set forth in the following claims.

I claim:

1. In an elongate electrical cable having an outer jacket and plural insulated conductors extending therethrough, a method of protecting an elongate central extent of said cable where said jacket is opened and said conductors are exposed, said method comprising the steps of:
    forming an elongate water dam on each side of said central extent, each said elongate water dam spanning a portion of said jacket and a portion of said central extent;
    disposing an upwardly opening pouch around each said water dam;
    filling each said pouch with a curable blocking compound; and
    sealably covering each of said filled dams and a portion of said central extent between said dams.

2. A method of claim 1 wherein said forming step includes, for each said side of said central extent:
    placing a first collar around said jacket adjacent said central extent; and
    placing a second collar around said conductors adjacent said first collar, said first and said collars defining said water dams.

3. A method of claim 2 wherein said disposing step includes, for each side of said central extent:
    disposing said pouch around said first and second collars to thereby define a containment region between said first and said collars.

4. A method of claim 3 wherein said filling step includes for each side of said central extent:
    pouring said curable compound into said containment region.

5. A method of claim 4 further including the step of:
    compressibly wrapping each of said filled containment regions.

6. A method of claim 4 further including the steps of:
    separating said insulated conductors into plural groups at said central extent; and
    pouring said curable compound into said containment region between said separated groups of conductors.

7. A method of claim 6 wherein said separating step includes:
    wrapping said groups of plural insulated conductors with an adhesive-backed tape.

8. A method of claim 1 wherein said curable blocking compound is a viscous fluid.

9. A method of preventing water tracking within a jacket of an electrical cable from entering into a centrally disposed cable splice, comprising the steps of:
    disposing a pouch around said cable on each side of said cable splice; and
    filling each said pouch with a curable blocking compound to form a water block around said cable on each side of said cable splice.

10. A method of claim 9 further including the step of:
    compressibly wrapping each said filled pouch.

11. A method of claim 9 further including the step of:
    sealably covering each said filled pouch and said centrally disposed cable splice.

* * * * *